(12) United States Patent
Frances

(10) Patent No.: US 7,574,295 B2
(45) Date of Patent: Aug. 11, 2009

(54) METHOD FOR CONTROLLING AUTOMATIC OR AUTOMATED TRANSMISSION DOWNSHIFT USED FOR POWER BRAKING

(75) Inventor: Emmanuel Frances, Chaville (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 286 days.

(21) Appl. No.: 10/599,815

(22) PCT Filed: Mar. 25, 2005

(86) PCT No.: PCT/FR2005/050195

§ 371 (c)(1), (2), (4) Date: Oct. 30, 2006

(87) PCT Pub. No.: WO2005/100827

PCT Pub. Date: Oct. 27, 2005

(65) Prior Publication Data

US 2008/0020895 A1    Jan. 24, 2008

(30) Foreign Application Priority Data

Apr. 7, 2004   (FR) .................................. 04 50699

(51) Int. Cl.
*G06F 7/00* (2006.01)
(52) U.S. Cl. ........................... 701/57; 701/56; 180/170; 180/370

(58) Field of Classification Search .................. 180/197, 180/170, 370, 65.3; 701/87, 53, 56, 62, 57, 701/6
See application file for complete search history.

(56) References Cited

U.S. PATENT DOCUMENTS

| | | | |
|---|---|---|---|
| 4,829,435 A | 5/1989 | Isono | |
| 5,016,495 A | 5/1991 | Takizawa | |
| 5,262,952 A * | 11/1993 | Tsuyama et al. | ............... 701/87 |
| 5,527,235 A * | 6/1996 | Kuroda et al. | ................. 477/94 |
| 6,360,155 B1 | 3/2002 | Taffin et al. | |
| 7,410,023 B2 * | 8/2008 | Crombez | ..................... 180/197 |

FOREIGN PATENT DOCUMENTS

| | | |
|---|---|---|
| EP | 0991880 A | 4/2000 |
| EP | 0991880 B1 | 11/2002 |
| FR | 2655121 A | 5/1991 |

OTHER PUBLICATIONS

International Search Report (ISR) mailed Aug. 18, 2005 in PCT/FR2005/050195.

\* cited by examiner

*Primary Examiner*—Mark Hellner
(74) *Attorney, Agent, or Firm*—Nicolas E. Seckel

(57) ABSTRACT

The invention concerns a method for controlling automatic or automated transmission downshift used for power braking and comprising set of predetermined shifting laws, characterized in that it consists, below a certain arbitrary threshold $E_{threshold}$ of the accelerator pedal depression, in defining a new downshift law designed to be substituted for the current standard downshift law.

11 Claims, 4 Drawing Sheets

METHOD FOR CONTROLLING AUTOMATIC OR AUTOMATED TRANSMISSION DOWNSHIFT USED FOR POWER BRAKING

BACKGROUND ART

The invention concerns a method for controlling downshifting steps in automatic or automated transmissions, so as to make it possible to improve the driving pleasure and the security of the vehicle.

In most methods for managing gear shifting in automatic mode, for automatic transmissions as well as for automated transmissions, gear shifting is decided by a computer as a function of the speed of the vehicle and the load of the engine. Most often, these criteria are translated in the form of gear shifting laws, which are represented in the form of curves constructed in a plane having the speed of the vehicle at the wheels $V_{veh}$ in abscissa and the degree of depression of the acceleration pedal in ordinate.

The general principle of the gear shifting laws is proposed in FIG. 1, in which curves $C_1$ and $C_2$ represent gear shifting laws by downshifting from N to N−1 and from N+1 to N, respectively.

According to this principle, it appears that a single shifting of gears by downshifting is possible at one time. Indeed, to pass from a transmission ratio N+1 to a transmission ratio N−1, the vehicle must undergo a certain deceleration so that the computer decides the passage from the transmission ratio N+1 to the transmission ratio N, then the passage from the transmission ratio N to the transmission ratio N−1. For example, in the case where the driver decides to slow down the vehicle by releasing the acceleration pedal, then by braking, it is observed that we start at a point A to reach a point B which corresponds to the fact that the driver has released the acceleration pedal, then, when the speed of the vehicle at the wheels $V_{veh}$ cuts the curve $C_2$ at point C, the computer decides the passage from the transmission ratio N+1 to the transmission ratio N and, finally, when the speed of the vehicle at the wheels $V_{veh}$ cuts the curve $C_1$ at point D, the computer decides the passage from the transmission ratio N to the transmission ratio N−1. Overall, a few seconds go by to pass from the transmission ratio N+1 to the transmission ratio N−1.

It is observed also that downshifting, according to the general principle of the gear shifting laws, does not take into account parameters other than the speed of the vehicle and the load of the vehicle, such as the intensity of braking, the duration of braking, or the driving style of the driver.

In summary, the general principle of the gear shifting laws such as described above does not make it possible to anticipate downshifting operations that generate engine braking, in the case where the driver wishes to slow down the vehicle or obtain some acceleration.

In order to remedy this drawback, recent systems for controlling automatic gearboxes, based on the calculation in real time of the engine speed under which a downshifting is decided, have been developed. It is the case, for example, with the patent EP 0991880 B1 which claims a method for controlling downshifting making it possible, among others, to anticipate downshifting as a function of the load of the vehicle, the duration of braking the intensity of braking, the driving style of the driver, and the speed of the vehicle. The method for controlling downshift described in the patent EP 0991880 B1 consists in determining, during braking, as a function of the intensity and the duration of braking, of the declivity of the road, and of the driving style of the vehicle, the threshold value of the speed of the input shaft of the gearbox $\Omega_{threshold}$, under which the classic law for shifting gears is no longer used, and under which the anticipated downshifting from a transmission ratio N to a transmission ratio N−1 is imposed.

SUMMARY OF THE INVENTION

However, the method for controlling downshifting of the automatic transmission as described in the patent EP 0991880 B1 does not make it possible to anticipate downshifting of more than one transmission ratio. I.e., it is not possible to pass directly from a transmission ratio N to a transmission ratio N−2, because the computer must first decide to engage the transmission ratio N−1 before having to decide whether it is necessary to engage the transmission ratio N−2.

Accordingly, a goal of the present invention is a method for controlling automatic or automated transmission downshift, making it possible to anticipate a gear shift with downshifting of more than one transmission ratio.

More precisely, an object of the invention is a method for automatic or automated transmission downshift used for power braking and comprising a group of standard downshift laws, characterized in that it consists in defining, below a certain arbitrary threshold $E_{threshold}$ of depression of the acceleration pedal, a new downshift law intended to replace the standard downshift law in activity.

The new downshift law is defined by a gap $\Delta_{(n)(n-1)}$ of the downshift law in activity, this gap $\Delta_{(n)(n-1)}$ being calculated between the arbitrary threshold $E_{threshold}$ of depression of the acceleration pedal and the depression zero of the acceleration pedal.

The calculation of the gap $\Delta_{(n)(n-1)}$ of the gear shifting law in activity comprises the following steps:

determining by fuzzy logic, for an engaged transmission ratio, for a depression E of the acceleration pedal of zero and from the deceleration of the vehicle due to braking, the duration of braking, the speed of the vehicle, and the load of the vehicle, an interval I of speeds of the input shaft of the gearbox of the engine in which downshifting must be engaged, this interval I comprising an upper limit $\Omega_{Sport}$ which corresponds to a sportive driving style and a lower limit $\Omega_{Eco}$ which corresponds to an economical driving style, determining by linear extrapolation as a function of a sportivity index ($I_{sportivity}$) of the driving style of the driver, itself determined by fuzzy logic, and as a function of the speeds ($\Omega_{Eco}$) and ($\Omega_{Sport}$) calculated previously, the speed ($\Omega_{threshold}$) of the input shaft of the gearbox of the engine below which downshifting must be triggered, converting the speed $\Omega_{threshold}$ of the input shaft of the gearbox of the engine to a speed of the vehicle at the wheel $V_{veh(n)(n-1)}$ for each transmission ratio N, this speed $V_{veh(n)(n-1)}$ corresponding to the position where the depression of the acceleration pedal is zero, calculating by linear interpolation the gap $\Delta_{(n)(n-1)}$ between the position where the depression E of the acceleration pedal is zero and the position where the depression E of the acceleration pedal is equal to the arbitrary threshold $E_{threshold}$ of the depression of the acceleration pedal, verifying that the gap $\Delta_{(n)(n-1)}$ is above or equal to zero, otherwise keeping the result obtained with the standard downshift law.

The invention concerns also an automatic transmission implementing the method for controlling downshift used for power braking as described above.

BRIEF DESCRIPTION OF THE DRAWINGS

The invention will be better understood by referring to the following description presented as a non-limitative example and to the annexed drawings in which.

DETAILED DESCRIPTION OF PARTICULAR EMBODIMENTS

Figure 1:
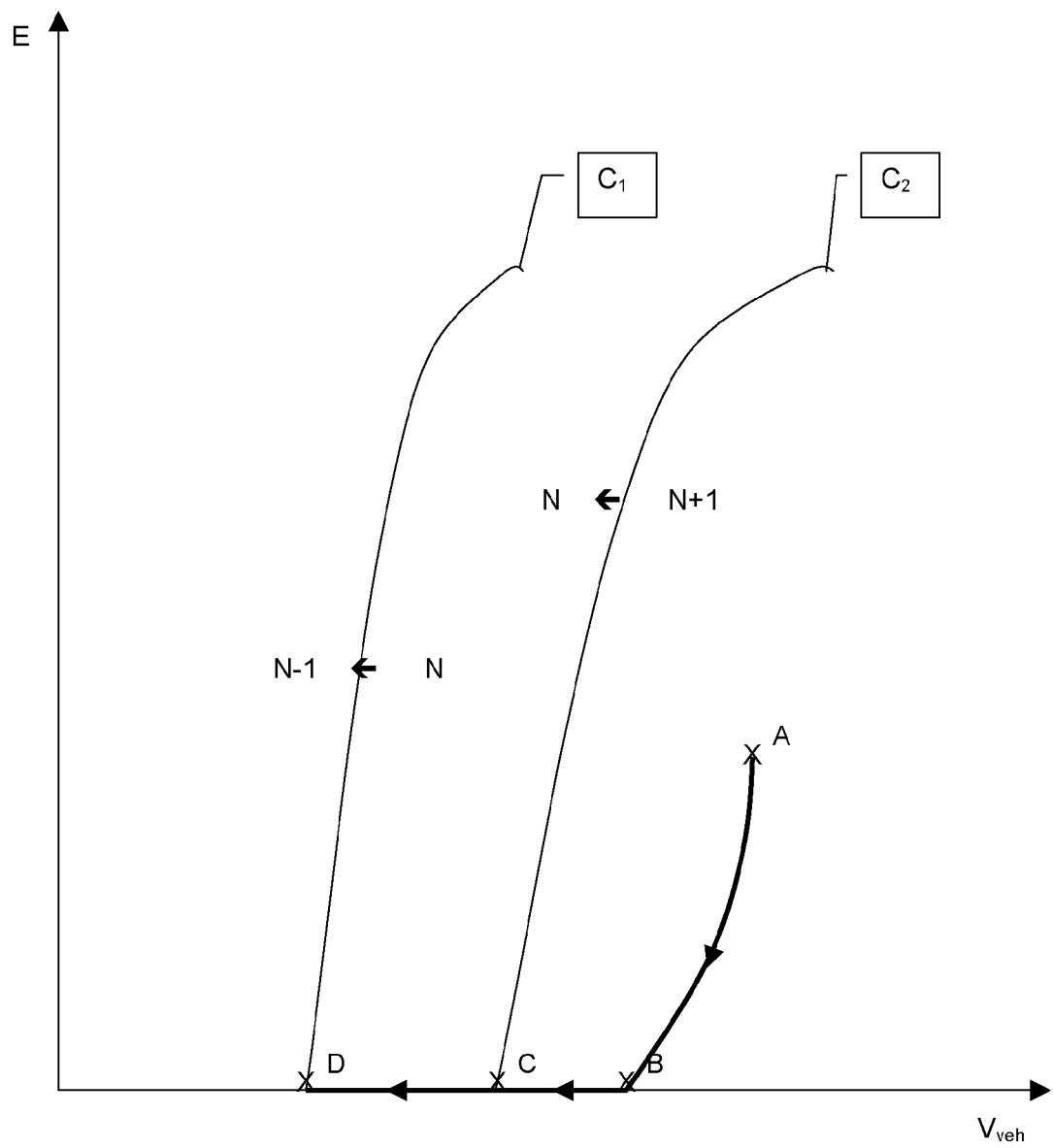
FIG. 1 represents a graph of standard gear shifting laws comprising, in abscissa, the speed of the vehicle at the wheel $V_{veh}$, and in coordinate, the depression E of the acceleration pedal.
Figure 2:
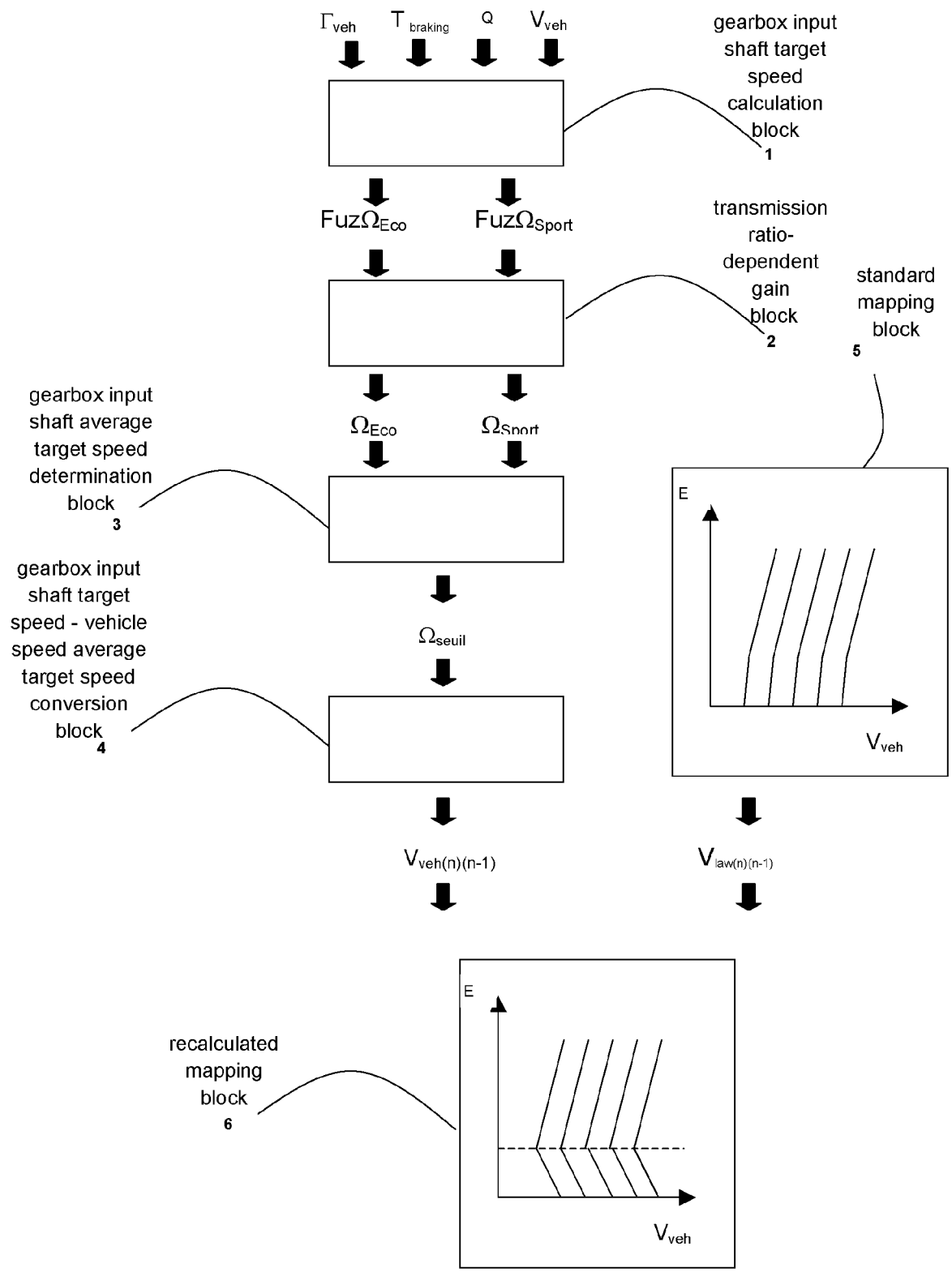
FIG. 2 represents the principle for obtaining the new gear shifting laws according to the method for controlling downshift used for power braking described in our invention, FIG. 3 includes an example of determination by fuzzy logic of the target speed of the input shaft of the gearbox corresponding to an economic driving style $Fuz\Omega_{Eco}$ for a load Q of the vehicle equal to zero and for a low speed of the vehicle $V_{veh}$.
Figure 3:
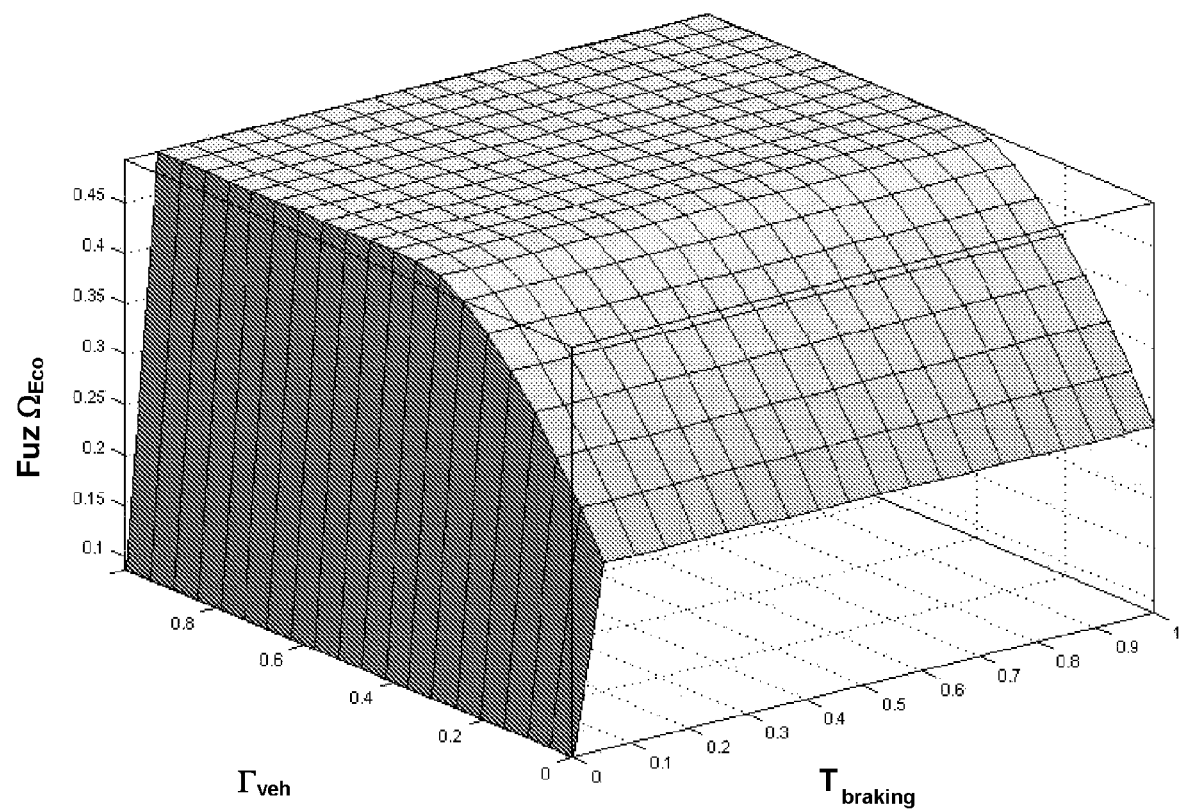

Reference is made to FIGS. 2 and 3 to explain in more details the method for controlling downshift used for power braking according to the invention. During the braking phase, a first computing unit, named block 1, will receive the following data:

$V_{veh}$, which corresponds to a measurement of the speed of the vehicle at the wheels, $\Gamma_{veh}$, which represents the deceleration of the vehicle obtained either by derivation and filtering of the speed of the vehicle $V_{veh}$ or by a physical measurement, $T_{braking}$, which represents the duration of braking, which is incremented from a zero value as soon as the braking contact is activated, Q, which represents the load of the vehicle, determined in a standard manner by the following formula:

$Q = F_{driv} - F_{resistant} - M.\Gamma_{veh}$, where $F_{driv}$ is the driving force at the wheels $F_{resistant}$ is the total of forces of resistance to movement, in connection, for example, with the aerodynamics of the vehicle or the adherence of the road.

M is the mass of the empty vehicle.

From the data $\Gamma_{veh}$, $V_{veh}$, $T_{braking}$ and Q and in a manner analogous to the method described in the patent EP 0991880 B1, the block 1 calculated by fuzzy logic the target speed of the input shaft of the gearbox corresponding to an economical driving style $Fuz\Omega_{Eco}$ and the target speed of the input shaft of the gearbox corresponding to a sportive driving style $Fuz\Omega_{Sport}$. The target speed of the input shaft of the gearbox is the limit speed at the clutch output for a robotized gearbox, also called automated transmission, or at the converter output for an automatic transmission, below which downshift is anticipated.

As an indicative and non-limitative mention, the calculations by fuzzy logic used for determining the target speed of the input shaft of the gearbox corresponding to an economical driving style $Fuz\Omega_{Eco}$ are performed for a depression zero of the acceleration pedal since we are in braking mode, and they are illustrated in an example on FIG. 3. This figure represents a graph in three dimensions making it possible to determine, as a function of the deceleration $\Gamma_{veh}$ and of the duration of braking $T_{braking}$, the target speed of the input shaft of the gearbox corresponding to an economical driving style $Fuz\Omega_{Eco}$. The graph corresponds also to a situation where the load Q of the vehicle is zero and where the speed $V_{veh}$ is low. The values $\Gamma_{veh}$, $T_{braking}$ and $Fuz\Omega_{Eco}$ are given as a membership degree comprised between 0 and 1. Thus, for a deceleration value $\Gamma_{veh}$ which is equal to 0.2 (i.e., 101.6 rev/min/sec) and a duration of braking $T_{braking}$ which is equal to 0.1 (i.e., 2.55 sec), the target speed of the input shaft of the gearbox corresponding to an economical driving style $Fuz\Omega_{Eco}$ is equal to 0.25 (i.e., 2,040 rev/min).

Then, the block 2 applies a gain to the target speeds calculated previously as a function of the transmission ratio N engaged previously. This gain makes it possible to obtain the same target speed after downshifting for an equivalent target speed before downshifting, even though the stepping of the transmission reductions is not constant from one initial gear to the other.

Thus, for an engaged transmission ratio N, and from the deceleration of the vehicle due to braking $\Gamma_{veh}$, the duration of braking $T_{braking}$, the speed of the vehicle $V_{veh}$, and the load of the vehicle Q, an interval I of speeds of the input shaft of the gearbox of the engine in which downshifting must be engaged has been determined, this interval I comprising an upper limit $\Omega_{Sport}$ which corresponds to a sportive driving style and a lower limit $\Omega_{Eco}$ which corresponds to an economical driving style.

From the two limits of the interval I, the block 3 determines, by linear interpolation and as a function of a sportivity index of the driver $I_{sportivity}$ determined by fuzzy logic, the average target speed of the input shaft of the gearbox:

$$\Omega_{threshold} = \Omega_{Eco} + (\Omega_{Sport} - \Omega_{Eco}).I_{sportivity}$$

The block 4 then converts the average target speed of the input shaft of the gearbox $\Omega_{threshold}$ into an average target speed of the speed of the vehicle at the wheels for each transmission ratio N as a function of the transmission ratio of the gearbox $R'_n$ and of the transmission ratio of the axle assembly $R''_n$ according to the formula:

$$V_{veh(n)(n-1)} = \Omega_{threshold}.R'_n.R''_n$$

Figure 4:
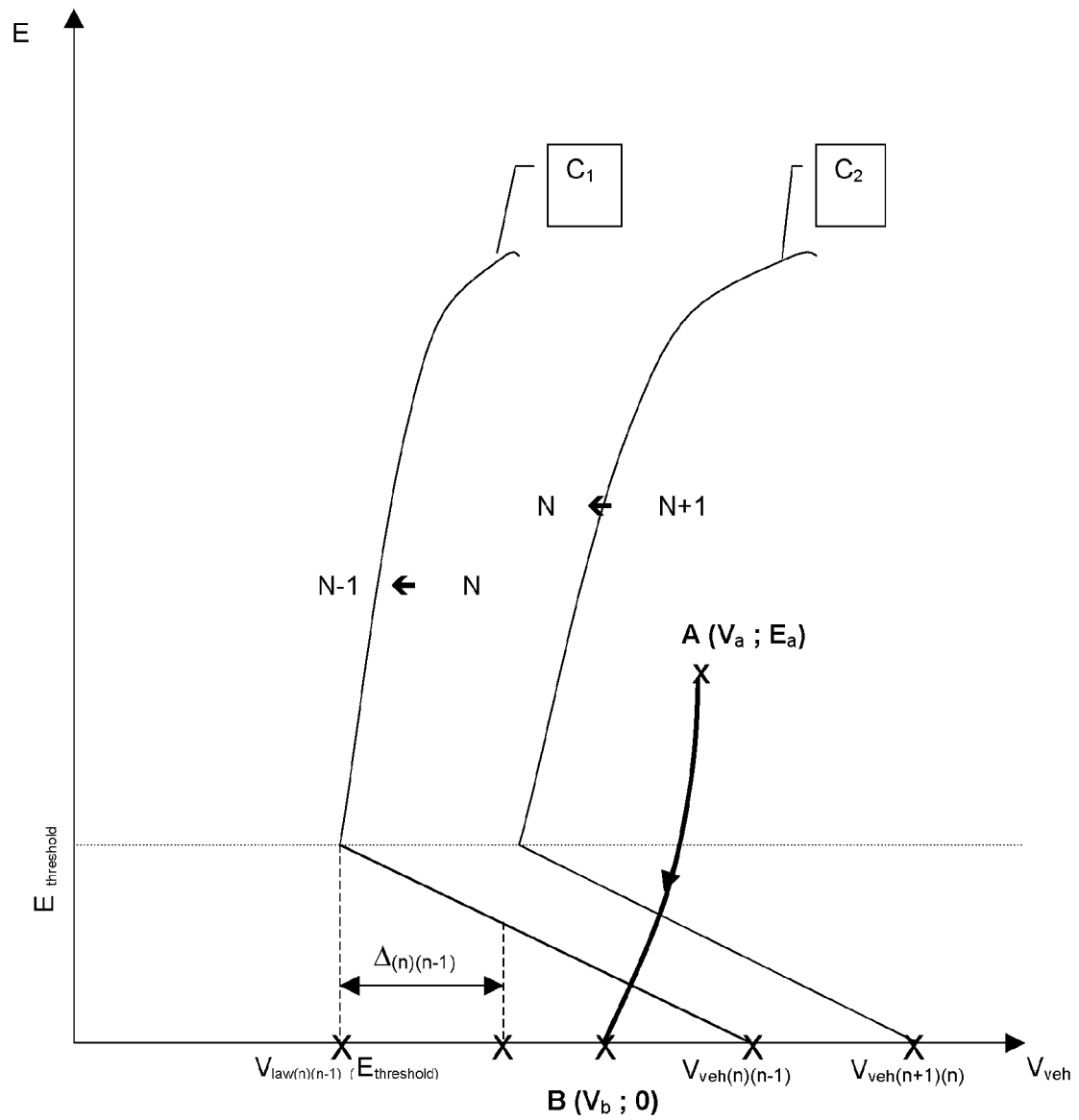
FIG. 4 represents in a graph the new gear shifting laws according to the method for controlling downshift used for power braking described in our invention.

It is then observed, by reference to FIG. 4, that the average target speed of the speed of the vehicle at the wheels $V_{veh(n)(n-1)}$ corresponds to the position where the depression E of the acceleration pedal is zero and where gear shifting from N to N−1 must be engaged.

Finally, based on the gear shifting laws elaborated by standard mapping in the block 5, the block 6 recalculates the gear shifting laws by linear interpolation between the position where the depression E of the acceleration pedal is zero and where the average target speed of the speed of the vehicle at the wheels is equal to $V_{veh(n)(n1)}$ and the position where the depression E of the acceleration pedal is equal to an arbitrarily chosen threshold $E_{threshold}$ and where the corresponding average target speed of the speed of the vehicle at the wheels is determined according to standard mapping in block 5, i.e., $V_{law(n)(n-1)}$. As a consequence, the gear shifting law between the two positions of the acceleration pedal defined previously admits a gap $\Delta_{(n)(n-1)}$ which is equal to $V_{veh(n)(n-1)} - V_{law(n)(n-1)}(E_{threshold})$ when the depression E of the acceleration pedal is zero and if $V_{veh(n)(n-1)} - V_{law(n)(n-1)}$ $(E_{threshold})$ is above or equal to zero and which is equal to zero when the depression E of the acceleration pedal is equal to $E_{threshold}$.

The gear shifting law, established by linear interpolation between the two positions of the acceleration pedal defined previously, can be expressed as follows:

$$\Delta_{(n)(n-1)} = (V_{veh(n)(n-1)} - V_{law(n)(n-1)}(E_{threshold})).$$
$$(E_{threshold} - E)/E_{threshold})$$

By reference to FIG. 4, it appears that, in a standard braking situation where the driver releases first the acceleration pedal before braking, one starts from a point A which corresponds to a transmission ratio N+1 engaged and which corresponds to a certain speed $V_a$ and to a certain depression of the acceleration pedal $E_a$, to move toward a point B which corresponds to a lower speed $V_b$ and to a depression of the acceleration pedal which is zero. When the driver begins to brake, the method for controlling downshift relative to our invention calculates the gaps $\Delta_{(n+1)(n)}$ and $\Delta_{(n)(n-1)}$ for each of the gear shifting laws N+1/N and N/N−1 corresponding to curve $C_2$ and to curve $C_1$, respectively. Since $V_b$ is lower than $V_{veh(n)(n-1)}$, the method for controlling downshift deducts therefrom that it is necessary to engage the transmission ratio N−1. Thus, one passes directly and in an anticipated manner from a transmission ratio N+1 to a transmission ratio N−1.

The invention claimed is:

1. Method for controlling automatic or automated transmission downshift used for power braking of a vehicle and comprising a group of at least two standard downshift laws ($C_{(n)(n-1)}$, $C_{(n+1)(n)}$) between a gear n+1 and a gear n, and between a gear n and a gear n−1, respectively, as a function of the speed at the wheel (V) and acceleration pedal depression (E), comprising, when the driver begins to brake when the vehicle is in gear n+1:

defining, below a certain arbitrary threshold ($E_{threshold}$) of depression of the acceleration pedal, a group of new downshift laws intended to replace the standard downshift laws, each new downshift law being shifted by a gap ($\Delta_{(n)(n-1)}$, $\Delta_{(n+1)(n)}$) with respect to the respective standard downshift law, this gap ($\Delta_{(n)(n-1)}$, $\Delta_{(n+1)(n)}$) being calculated between the arbitrary threshold ($E_{threshold}$) of depression of the acceleration pedal and the depression zero of the acceleration pedal, and downshifting the transmission by at least one transmission ratio if the calculated gaps ($\Delta_{(n)(n-1)}$, $\Delta_{(n+1)(n)}$) are such that the operating point of the vehicle defined by the speed at the wheel (V) and the acceleration pedal depression (E) when the driver begins to brake becomes lower than at least one ($C_{(n+1)(n)}+\Delta_{(n+1)(n)}$) of the new downshift laws, wherein the transmission is downshifted directly by more than one transmission ratios if the calculated gaps ($\Delta_{(n)(n-1)}$, $\Delta_{(n+1)(n)}$) are such that the operating point of the vehicle (V,E) when the driver begins to brake becomes lower than more than one of the new downshift laws.

2. Method for controlling according to claim 1, wherein the calculation of the gap ($\Delta_{(n)(n-1)}$) of the gear shifting law in activity comprises the following steps:

a) determining by fuzzy logic, for an engaged transmission ratio, for a depression (E) of the acceleration pedal equal to zero and from the deceleration of the vehicle due to braking ($\Gamma_{veh}$), the duration of braking ($T_{braking}$), the speed of the vehicle ($V_{veh}$) and the load of the vehicle (Q), an interval (I) of speeds of the input shaft of the gearbox of the engine in which downshifting must be triggered, this interval (I) comprising an upper limit ($\Omega_{Sport}$) which corresponds to a sportive driving style and a lower limit ($\Omega_{Eco}$) which corresponds to an economical driving style, b) determining by linear extrapolation as a function of a sportivity index ($I_{sportivity}$) of the driving style of the driver, itself determined by fuzzy logic, and as a function of the speeds ($\Omega_{Eco}$) and ($\Omega_{Sport}$) calculated previously, the speed ($\Omega_{threshold}$) of the input shaft of the gearbox of the engine below which downshifting must be triggered, c) converting the speed ($\Omega_{threshold}$) of the input shaft of the gearbox to a speed of the vehicle at the wheel ($V_{veh(n)(n-1)}$) for each gear (N), this speed ($V_{veh(n)(n-1)}$) corresponding to the position where the depression (E) of the acceleration pedal is zero, d) calculating by linear interpolation the gap ($\Delta_{(n)(n-1)}$) between the position where the depression (E) of the acceleration pedal is zero and the position where the depression (E) of the acceleration pedal is equal to the arbitrary threshold ($E_{threshold}$) of the depression of the acceleration pedal, e) verifying that the gap ($\Delta_{(n)(n-1)}$) is above or equal to zero, otherwise keeping the result obtained with the standard dowhshifi law.

3. Automatic or automated transmission of a motor vehicle, which controls automatic or automated transmission downshift used for power braking according to the method of claim 1.

4. Automatic or automated transmission of a motor vehicle, which controls automatic or automated transmission downshift used for power braking according to the method of claim 2.

5. Method for controlling according to claim 1, wherein the speed of the vehicle at the wheel ($V_{(n)(n-1)}$, $V_{(n+1)(n)}$) corresponding to the depression zero of the acceleration pedal according to each downshift law is calculated by fuzzy logic.

6. Method for controlling according to claim 5, wherein the speed of the vehicle at the wheel ($V_{(n)(n-1)}$, $V_{(n+1)(n)}$) corresponding to the depression zero of the acceleration pedal according to each downshift law is calculated as a function of the deceleration of the vehicle due to braking ($\Gamma_{veh}$), the duration of braking ($T_{braking}$), the speed of the vehicle ($V_{veh}$) and the load of the vehicle (Q).

7. Method for controlling according to claim 6, wherein the speed of the vehicle at the wheel ($V_{(n)(n-1)}$, $V_{(n+1)(n)}$) corresponding to the depression zero of the acceleration pedal according to each downshift law is calculated as a function of a sportivity index ($I_{sportivity}$) of the driving style of the driver, itself determined by fuzzy logic.

8. Method for controlling according to claim 7, comprising:

a) determining by fuzzy logic, for an engaged transmission ratio, for a depression (E) of the acceleration pedal equal to zero and from the deceleration of the vehicle due to braking ($\Gamma_{veh}$), the duration of braking ($T_{braking}$), the speed of the vehicle ($V_{veh}$) and the load of the vehicle (Q), an interval (I) of speeds of the input shaft of the gearbox of the engine in which downshifting must be triggered, this interval (I) comprising an upper limit ($\Omega_{Sport}$) which corresponds to a sportive driving style and a lower limit ($\Omega_{Eco}$) which corresponds to an economical driving style, b) determining by linear extrapolation as a function of a sportivity index ($I_{sportivity}$) of the driving style of the driver, itself determined by fuzzy logic, and as a function of the speeds ($\Omega_{Eco}$) and ($\Omega_{Sport}$) calculated previously, the speed ($\Omega_{threshold}$) of the input shaft of the gearbox of the engine below which downshifiing must be triggered, c) converting the speed ($\Omega_{threshold}$) of the input shaft of the gearbox to the speed of the vehicle at the wheel ($V_{(n)(n-1)}$, $V_{(n+1)(n)}$) corresponding to the depression zero of the acceleration pedal for each gear (N).

9. Method for controlling according to claim 8, wherein the gap ($\Delta_{(n)(n-1)}$, $\Delta_{(n+1)(n)}$) is calculated by linear interpolation between the position where the depression (E) of the acceleration pedal is zero and the position where the depression (E) of the acceleration pedal is equal to the arbitrary threshold ($E_{threshold}$) of the depression of the acceleration pedal.

10. Method for controlling according to claim 1, wherein the gap($\Delta_{(n)(n-1)}$, $\Delta_{(n+1)(n)}$) is calculated by linear interpolation between the position where the depression (E) of the acceleration pedal is zero and the position where the depression (E) of the acceleration pedal is equal to the arbitrary threshold ($E_{threshold}$) of the depression of the acceleration pedal.

11. Method for controlling according to claim 1, comprising verifying that the gap ($\Delta_{(n)(n-1)}$) is above or equal to zero, otherwise keeping the result obtained with the standard dowhshift law.

* * * * *